(12) United States Patent
Novaes

(10) Patent No.: US 6,460,068 B1
(45) Date of Patent: Oct. 1, 2002

(54) FRACTAL PROCESS SCHEDULER FOR TESTING APPLICATIONS IN A DISTRIBUTED PROCESSING SYSTEM

(75) Inventor: Marcos N. Novaes, Hopewell Junction, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/071,217

(22) Filed: May 1, 1998

(51) Int. Cl.[7] .................................................. G06F 9/00
(52) U.S. Cl. ........................................ 709/102; 717/124
(58) Field of Search ................................. 709/100–108; 717/100–124; 714/46

(56) References Cited

U.S. PATENT DOCUMENTS

| | | | |
|---|---|---|---|
| 4,789,933 A | 12/1988 | Chen et al. | 364/413.13 |
| 5,132,831 A | 7/1992 | Shih et al. | 359/107 |
| 5,396,413 A | 3/1995 | Kaneko et al. | 364/140 |
| 5,430,658 A | 7/1995 | Divinsky et al. | 364/470 |
| 5,430,812 A | 7/1995 | Barnsley et al. | 382/235 |
| 5,486,280 A | 1/1996 | Bullock, IV et al. | 205/67 |
| 5,909,544 A * | 6/1999 | Anderson, II et al. | 395/712 |
| 6,014,760 A * | 1/2000 | Silva et al. | 714/46 |
| 6,128,754 A * | 10/2000 | Graeve et al. | 714/39 |

* cited by examiner

Primary Examiner—St. John Courtenay, III
Assistant Examiner—Van H. Nguyen
(74) Attorney, Agent, or Firm—Lawrence D. Cutter; Floyd A. Gonzalez

(57) ABSTRACT

A fractal process scheduler for testing applications in a distributed processing system having a plurality of nodes. The scheduler includes an originating file containing a sequence of statements, each statement representing a fractal cell, an input file comprising statements from said originating file which generate vertices, a fractal parser for compiling the statements from the input file, one or more intermediate files produced by the fractal parser comprising intermediate results. The intermediate files are executable for scheduling a process of the application being tested to nodes of the distributed processing system. The schedular further includes a master file produced by said fractal parser, said master file which is executable for scheduling a process of the application being tested to nodes of the distributed processing system. The fractal parser maps the input file into the intermediate file and the master file in accordance with complex fractal expansions. The fractal expansions include simple fractal expansion, compounded fractal expansion, reciprocal fractal expansion, and recurrent fractal expansion.

22 Claims, 14 Drawing Sheets

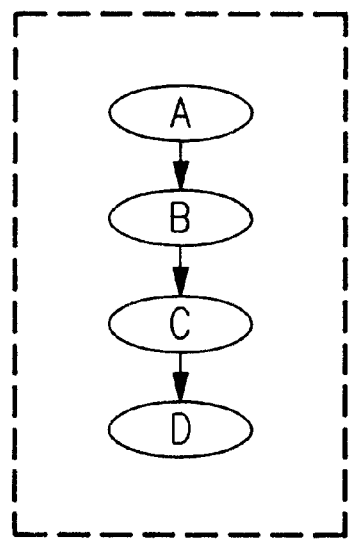
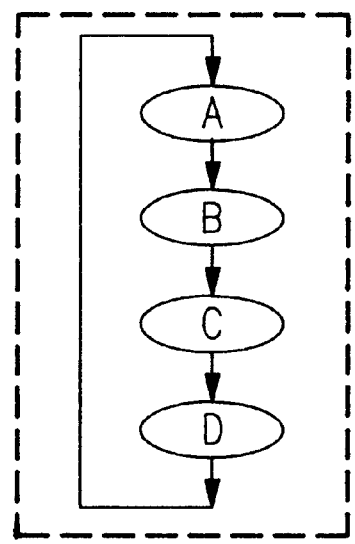
FIG.1　　　　　　　　FIG.2
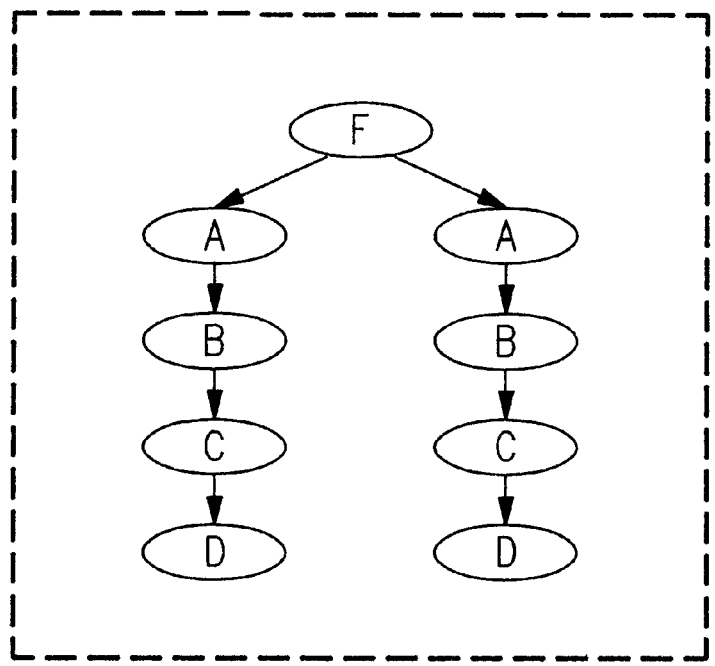
FIG.3

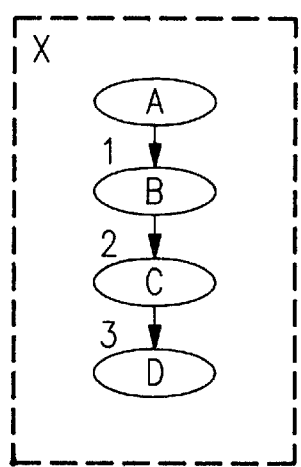
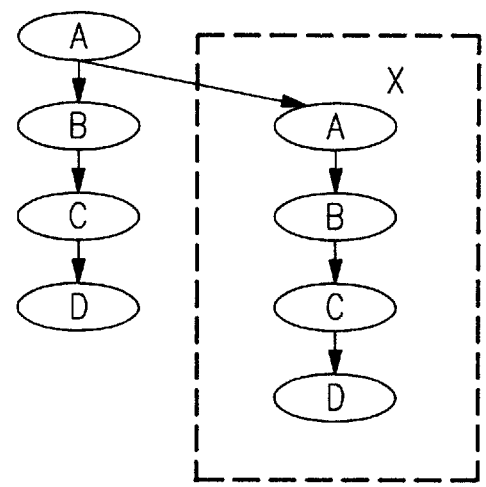
FIG.4  FIG.5
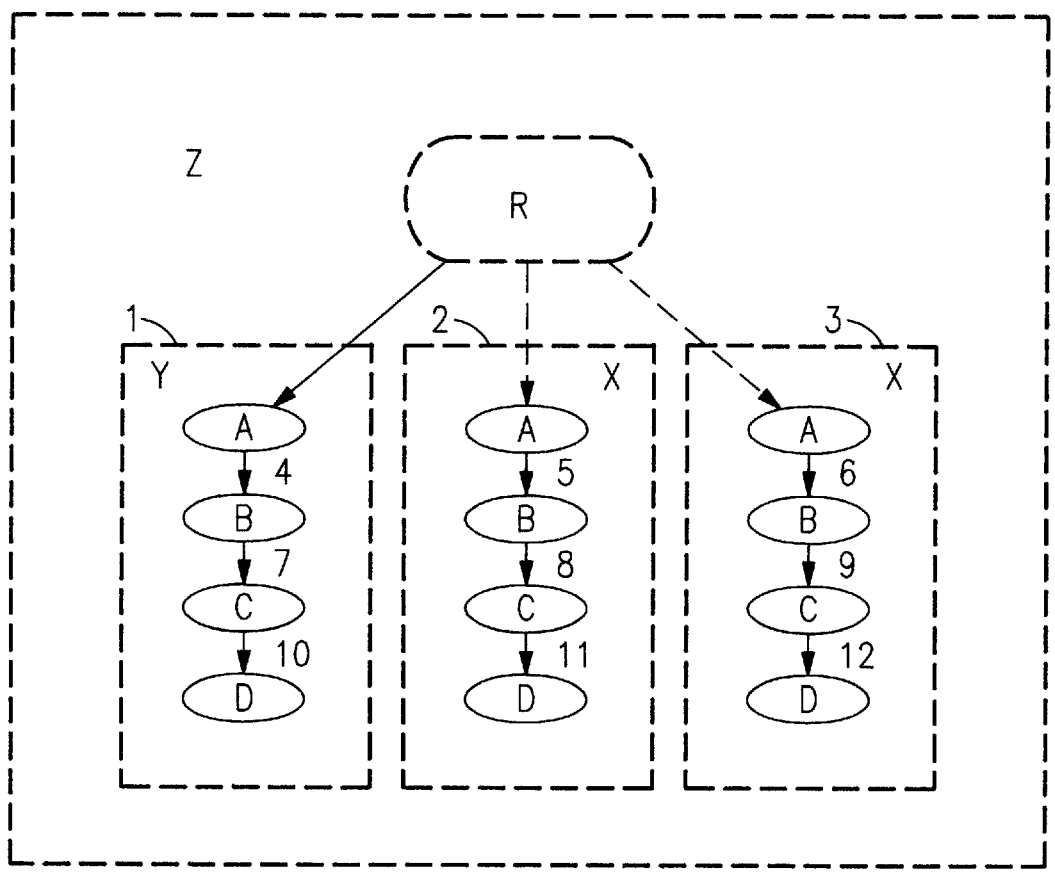
FIG.7

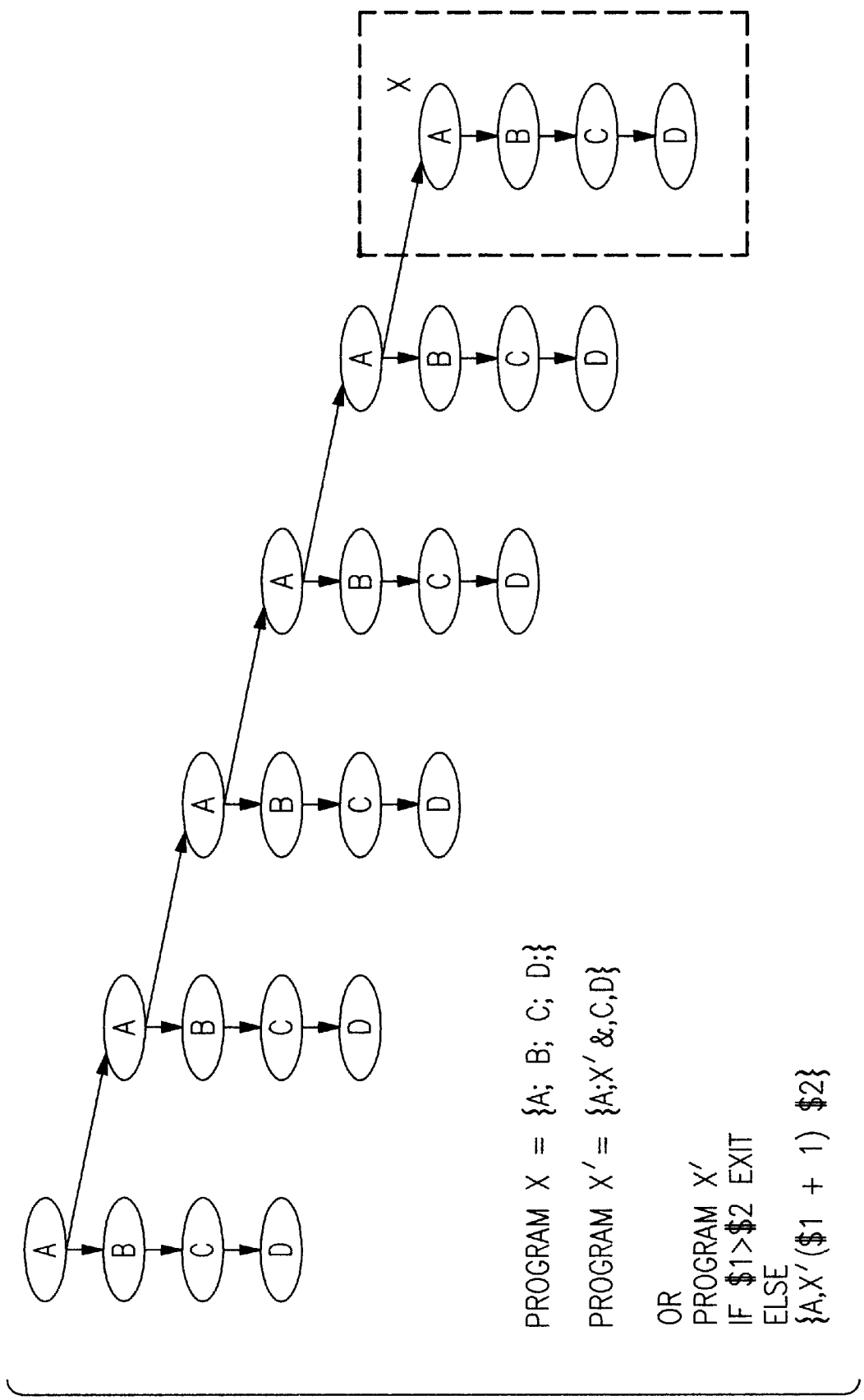

$C_1 = G^1$ $C_2$ $C_3$ $G^2$ $G^4$

FRACTAL PROCESS SCHEDULER FOR TESTING APPLICATIONS IN A DISTRIBUTED PROCESSING SYSTEM

The present invention is related to testing computer applications, and is more particularly related to applying principals of fractal geometry to testing applications in a distributed processing system.

BACKGROUND OF THE INVENTION

Fractal geometry is a field which studies self-similar graphic structures. A self-similar structure is characterized by a pattern of recursive reproduction of some basic structure. A good example is the Koch snowflake which can be built by the repeated substitution of some edges by a triangular form at every iteration. Although algorithms exist to realize the fractal expansion of geometrical forms, no study has been made of the application of this field to conventional computer graph theory. Since process graphs are best represented by tree-like structures, the present application testing concentrates on the fractal expansion of finite, connected, directed acyclic graphs. A simple fractal expansion has been used to test group services of a distributed processing system of the type disclosed in U.S. Pat. No. 5,699,501.

U.S. Pat. No. 5,430,658 issued Jul. 4, 1995 to Divinsky et al. for METHOD FOR CREATING SELF-GENERATING EMBROIDERY PATTERN, discloses a method for creating a self-generating embroidery design pattern, which may be provided alone or merged with an existing pattern by translation of fractal images into stitch patterns. The technique presented for creating stitch patterns appears to be a straight application of standard graphical rules for the generation for fractals.

U.S. Pat. No. 5,132,831 issued Jul. 21, 1992 to Shih et al. for ANALOG OPTICAL PROCESSING FOR THE CONSTRUCTION OF FRACTAL OBJECTS, discloses an analog optical processor for performing affine transformations and constructing fractal objects.

U.S. Pat. No. 5,396,413 issued Mar. 7, 1995 to Kaneko et al. for METHOD OF CONTROLLING AMENITY PRODUCTS OR ROTATING MACHINES, discloses applying fractal operation to motion of amenity products or rotating machines with a practical range and motion close to a natural phenomenon. This technique is not related to fractal geometry, but rather to fractal dimensions.

U.S. Pat. No. 4,789,933 issued Dec. 6, 1988 to Chen et al. for FRACTAL MODEL BASED IMAGE PROCESSING, discloses a medical diagnostic apparatus which generates medical diagnostic data which is reconstructed by an imager into an electronic image representation. The disclosed apparatus uses a time series with a fractal dimension wherein a filtered random generator is used to obtain a time series.

U.S. Pat. No. 5,430,812 issued Jul. 4, 1995 to Barnsley et al. of FRACTAL TRANSFORM COMPRESSION BOARD, discloses a digital image data compression apparatus including a controller circuit for receiving digital image data for processing the image data into blocks. Graphical geometry is used to map a nonfractal image into little fractal cells, and thus achieve compression, since the fractal rules take less encoding space. An image is divided into little pieces, and self similar cells are mapped to fractals from a template.

U.S. Pat. No. 5,486,280 issued Jan. 23, 1996 to Bullock, IV et al. for PROCESS FOR APPLYING CONTROL VARIABLES HAVING FRACTAL STRUCTURES, discloses a process and apparatus for the application of a control variable having a fractal structure to a body or process.

SUMMARY OF THE INVENTION

The present invention involves the application of Fractal Geometry principals (not fractal dimensions) to the field of Graph Theory. The Fractal Process Scheduler of the present invention solves the problem of exposing a distributed application to different scenarios for testing purposes. Typically, the tester develops a series of test cases, each of which address a specific scenario or protocol. This is the first part of the testing process. The second part is to schedule test cases for execution on a distributed system, in such a way that they will put the application being tested under considerable stress. In such a test environment it is desirable to run several of these test cases concurrently, but not strictly synchronized so that different time windows are created. Furthermore, this process must be easy to recreate, since re-creation will help the developers find and fix the defects found during the test run. These requirements rule out the most commonly used techniques for process scheduling. A simple fan out of the test cases will be strictly synchronized, and will not create different time windows. A simple serial execution will not create concurrency. The use of a random scheduler will not be able to re-create a scenario. The present state of the art is that the task of scheduling the test cases is left to the tester, who will have to code a process scheduler, which rivals in complexity with the test cases themselves. In the present invention, processes are defined as nodes in the graph, and the flow of control as edges. The scheduling algorithm is created by applying a fractal iteration to these nodes and edges. Nodes and edges are the building blocks in Graph Theory.

A primary object of the present invention is to provide a scheduler for testing applications in a distributed computing system wherein fractal expansion operations is applied to nodes and edges of a process scheduling chart graph to create deterministic sequences with very complex characteristics.

It is another object of the present invention to provide a scheduler wherein one sequences is a bounded simple fractal expansion.

It is another object of the present invention to provide a scheduler wherein another one of the sequences is a bounded compounded fractal expansion.

It is another object of the present invention to provide a scheduler wherein another one of the sequences is a bounded reciprocal fractal expansion.

It is another object of the present invention to provide a scheduler wherein another one of the sequences is a bounded recurrent fractal expansion.

It is another object of the present invention to provide a graphical user interface for use with a fractal process scheduler for testing applications of a distributed computing system.

It is another object of the present invention to provide a computer program product for scheduling processes of an application to be tested to nodes of a distributed processing system using complex fractal expansions.

It is another object of the present invention to provide a method for scheduling processes of an application to be tested to nodes of a distributed processing system using complex fractal expansions.

The foregoing and other objects, features and advantages of the invention will be apparent from the following more particular description of the preferred embodiment of the invention as illustrated in the drawings.

BRIEF DESCRIPTION OF THE DRAWINGS

FIG. 1 is a flow graph of a sequence of test cases;

FIG. 2 is a flow graph of a loop of test cases;

FIG. 3 is a flow graph of a fork or fan-out of test cases;

FIG. 4 is a fractal cell which contains a serial flow of test cases;

FIG. 5 is the result of fractal iteration ob one edge of the fractal cell of FIG. 4;

FIG. 6 is the result of five iterations described in connection with FIG. 5;

FIG. 7 is a more complex flow graph containing three fractal cells;

DESCRIPTION OF THE PREFERRED EMBODIMENT

The invention includes fractal iteration. In order to understand the underlying mechanism of these techniques, it is necessary to refer to fairly complex graphic structures.

In FIG. 1, a sequence of test cases is executed serially. This flow graph illustrates the fact that one test case terminates before the next one starts, so there is no concurrency. Serial execution is the primary way in which test cases are scheduled. The next major form of scheduling is the loop, shown in FIG. 2., which also does not create any concurrency. Concurrency can only be obtained using a fork or fan-out, as illustrated in FIG. 3. It will be understood from FIG. 3 that the fork will concurrently execute the series of test cases, with tight synchronization. In order to achieve the concurrent execution of the test cases with loose or no synchronization, the tester will have to combine the three principles illustrated in this page, often using other schemes such as rotation. The tester will have to code a script to schedule the test cases in an original way, and it is not unusual having to write several, one for each test scenario desired.

The principle of fractal iteration solves this problem by using fractal geometry. Examples of fractal geometries can be found in the various forms of snow flakes. A fractal form begins with a basic form, which is referred to herein as the "fractal cell", and an iterator, which will be referred to herein as the "fractal iterator". In FIG. 4 a fractal cell is depicted, labeled "X", which contains a serial flow of processes (test cases). The fractal iterator is defined on the edges of the flow graph contained in "X". In this example, the following fractal iteration on edge 1 is defined as:

$$AB(1)=AB|AX$$

The meaning of the above notation is defined as follows: "the edge AB (labeled 1) will be substituted by two edges, AB and AX. The result of this operation is depicted in FIG. 5. It will be noted that the flow graph in FIG. 5 still contains one instance of the fractal cell "X", so a new iteration is possible. Actually, as is the nature of the fractal process, an infinite number of iterations is possible. This process makes possible the creation of a new type of infinite loop which promotes concurrency and loose synchronization, which are highly praised properties in the testing context. The flow graph of FIG. 6 is the result of five of the fractal iterations described in connection with FIG. 5. Note how the test cases are executed concurrently, while the synchronization is totally loose, i.e., it will depend entirely on the duration of each test case. Furthermore, the fractal iteration process is entirely deterministic and can be recreated with precision.

Figure 8:
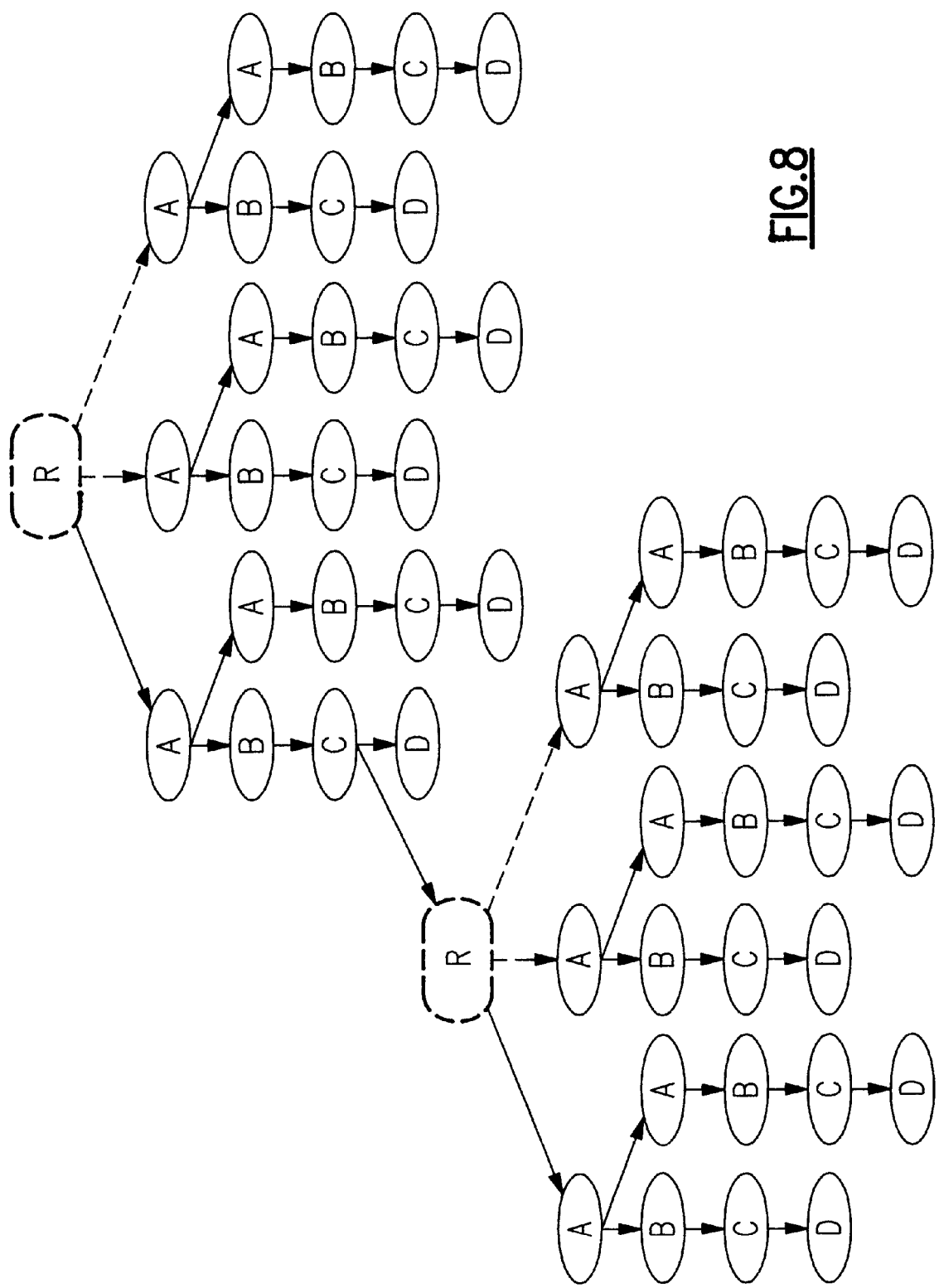
FIG. 8 shows the result of one single iteration of a fractal process showing how the processes are scheduled on remote nodes in a "cascade of cascades" fashion.

The example of FIG. 6 was quite simple and straight forward, and does not illustrate the full power of the fractal iteration process. In FIG. 7, a more complex flow graph is shown containing three fractal cells. The dotted lines in this illustration denote the fact that the flow is redirected for execution on a remote node. This scenario is more appropriate for the testing of a distributed application. The three fractal cells are labeled "X", "Y", and "Z". The following fractal iterators are defined:
CD(10)=CD|CR
AB(4)=AB|AY
AB(5)=AB|AX
AB(6)=AB|AX FIG. 8 shows the result of one single iteration of the fractal process defined above showing how the processes are scheduled on remote nodes in a "cascade of cascades" fashion. It will be appreciated how a few iterations would look in a flow chart, and the work that a programmer would have to re-create such flows, as compared to the present implementation.

The Fractal Iterator Process Scheduler implements the present invention with a very simple and convenient interface:
Input: A file which represents the fractal cell, labeled with the fractal cell name. This file should contain a series of commands (test case names) which are to be executed sequentially, the special character "*" inserted where a fractal iterator is to be defined. The fractal iterator definition follows the "*". For instance, in our first example in FIG. 4, the input would be a text file labeled "X", containing the following:
A;
*X
B;
C;
D;

That is all the user has to provide. The fractal test scheduler will take care of expanding the fractal tree and launching the test cases. For complex test cases, the number of processes created in an infinite expansion could be prohibitive, and so there is a way to specify the number of iterations of the fractal iteration using the "#" directive. For creating the flow graph in FIG. 6, we would use:
A;
*X#5
B;
C;
D;

For remote execution, the "rsh" command is used, and the user must supply the correct syntax of the command. Finally, the "dsh" command is used for executing the test cases on all nodes defined in the "dsh" syntax. In our second example, the user would need the cell "X" defined above, and the cells "Y" and "Z" defined as follows:
Cell Y:
  A;
  B;
  C;
  *Z;
  D;
Cell Z:
  R;
  rsh hostname1 X &
  rsh hostname2 X &
  Y;

Optionally the number of iterations can be specified for any "*" iteration directive. As we can see, the Fractal Process Scheduler is a powerful tool with a simple and convenient interface.

Other fractal expansions and their realizations will now be discussed.

Definitions $G = \{V, E\}$ is a finite, connected directed acyclic graph, defined by a set of vertices $V = \{V_0, V_1, \ldots V_{\|V\|-1}\}$, and a set of edges $E = \{E_1, E_2, \ldots E_{\|E\|}\};$ Where: $\|V\|$ and $\|E\|$ are the cardinalities of the sets V and E, respectively. Each edge is defined:

$E_i = (V_j, V_i)$ with $o \leq j < i \leq \|V\|-1$.

The vertex $V_o$ is therefore defined to be the root of G.

Define a set $C = \{C_1, C_2, \ldots C_{\|C\|}\},$ where each $C_i = \{V^{ci}, E^{ci}\};$ and $\forall i \in \{1, \|C\|\},$ $C_i$ is a finite, connected directed acyclic graph, called a "fractal cell".

A fractal iteration is a mapping $$G^k = \{V^k, E^k\} \rightarrow G^{k+1} = \{V^{k+1}, E^{k+1}\};$$

where:

$$V^{k+1} = \{V^k \cup E^{c1} \cup V^{c2} \cup \ldots \cup V^{c\|c\|}\};$$

$$E^{k+1} = \{E^k \cup E^{c1} \cup E^{c2} \cup \ldots \cup E^{c\|c\|} \cup \overline{E}^k\};$$

$$\overline{E}^k = \{\overline{E}^k_1, \overline{E}^k_2, \ldots, \overline{E}^k_{\|c\|}\},$$

where each $$\overline{E}^k_n = (V^{cm}_j, V^{cn}_o) \text{ with } V^{cm}_j \in G^k;$$

and $$G^o = \Phi$$

Figure 9A:
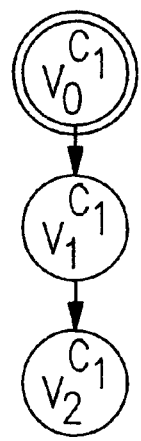
FIGS. 9A–9C is a simple unbounded fractal expansion of a graph.
Figure 9B:
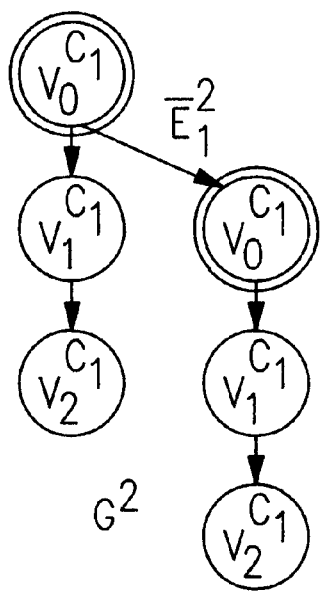
Figure 9C:
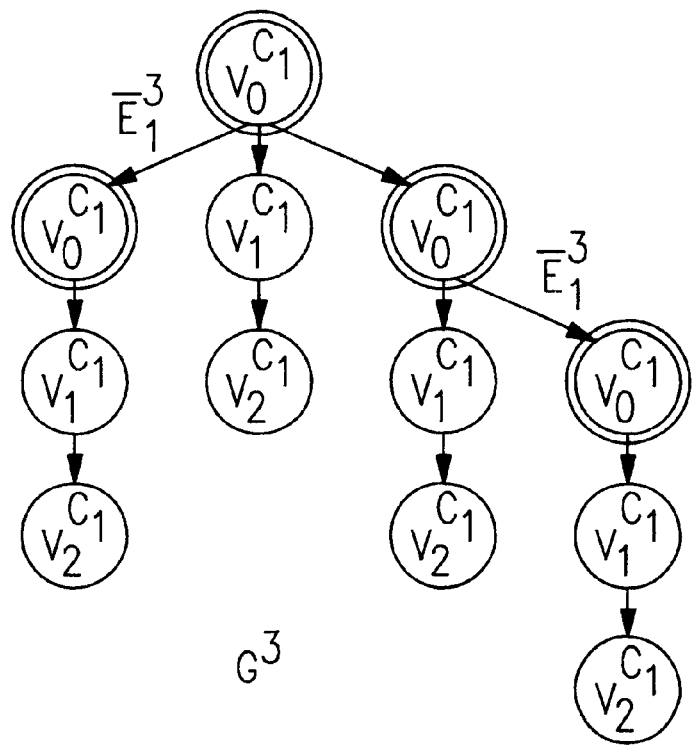

We can interpret the set of equations above as: "a fractal iteration is the expansion of a graph which adds to it all the trees in the set C by creating a new set of edges which connect some vertices which already belonged to the previous graph to the roots of the trees in C. The formulation above is a general case for fractal expansion, which we will denominate "unlimited fan-out" expansion. It is so called because new outbound edges will be added to the generating vertices $V^{cm}_j$ at every iteration, as shown in FIGS. 9A–9C.

In the specific application of process scheduling, it is desirable to limit the fan-out factor of the expansion. Specifically, we want that only vertices which belong to the newly added trees become generating vertices. This limitation can be accomplished by relabeling all the vertices in $G^{k+1} \cap G^k$. In our labeling scheme, we will add a super index f to the vertices, which will be incremented at each fractal iteration. The vertices in $\overline{G^{k+1} \cap G^k}$ are most recently added nodes, and will have f=0. That is:

$$V^{f+1m}_j \in G^{k+1} = V^{fm}_j \in G^k.$$

Figure 10A:
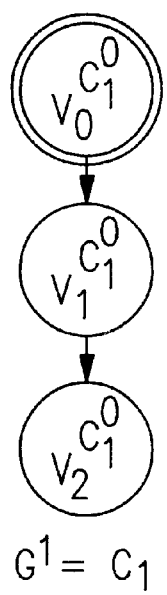
FIGS. 10A–10C is a simple bounded fractal expansion of a graph.
Figure 10B:
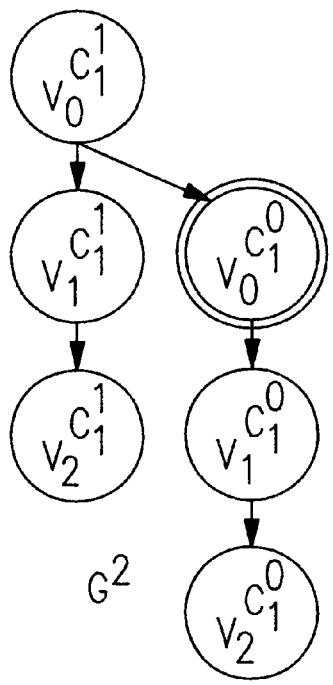
Figure 10C:
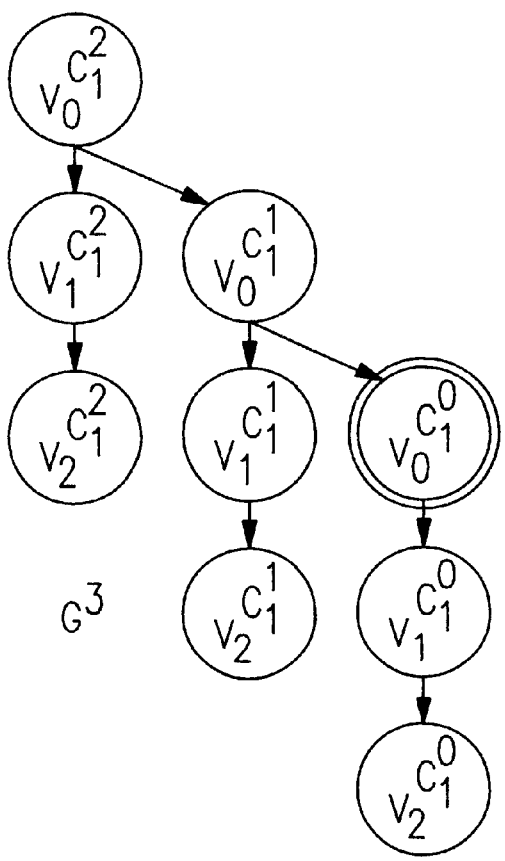

This is shown in FIGS. 10A–10C.

Categorization of Fractal Expansion Types

Fractal expansion is a recursive self-similar process. We can divide the possible realizations according to the nature of the set C.

If $\|C\| = 1,$ the expansion is said to be simple, as illustrated in FIG. 10–10C.

If $\|C\| > 1$ and there is ordering $C_1 \subset C_2 \subset \ldots \subset C_{\|c\|} \forall C_i \in C;$ then the expansion is said to be compounded.

If $\|C\| = 2$ and $C_1 \cap C_2 = \Phi,$ then the expansion is denominated reciprocal. Lastly, if $\|C\| > 2$ and $C_1 \cap C_2 \cap \ldots \cap C_{\|c\|} = \Phi, \forall C_i \in C$ then the expansion is said to be recurrent.

Any combination of the expansion types above is also possible, and such combinations are called hybrids.

EXAMPLES

Figure 11A:
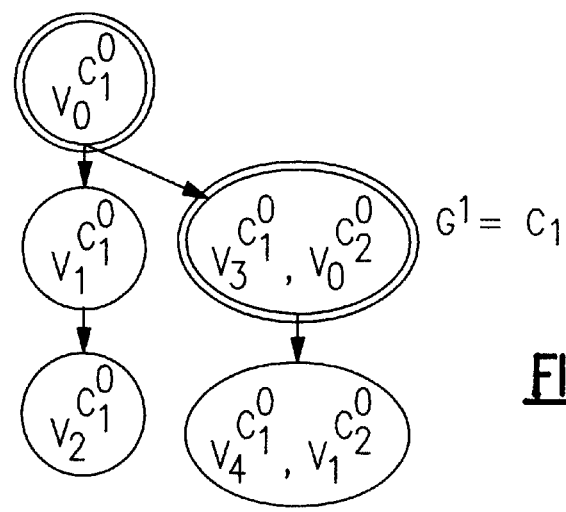
FIGS. 11A–11B is a bounded compounded fractal expansion of a graph.
Figure 11B:
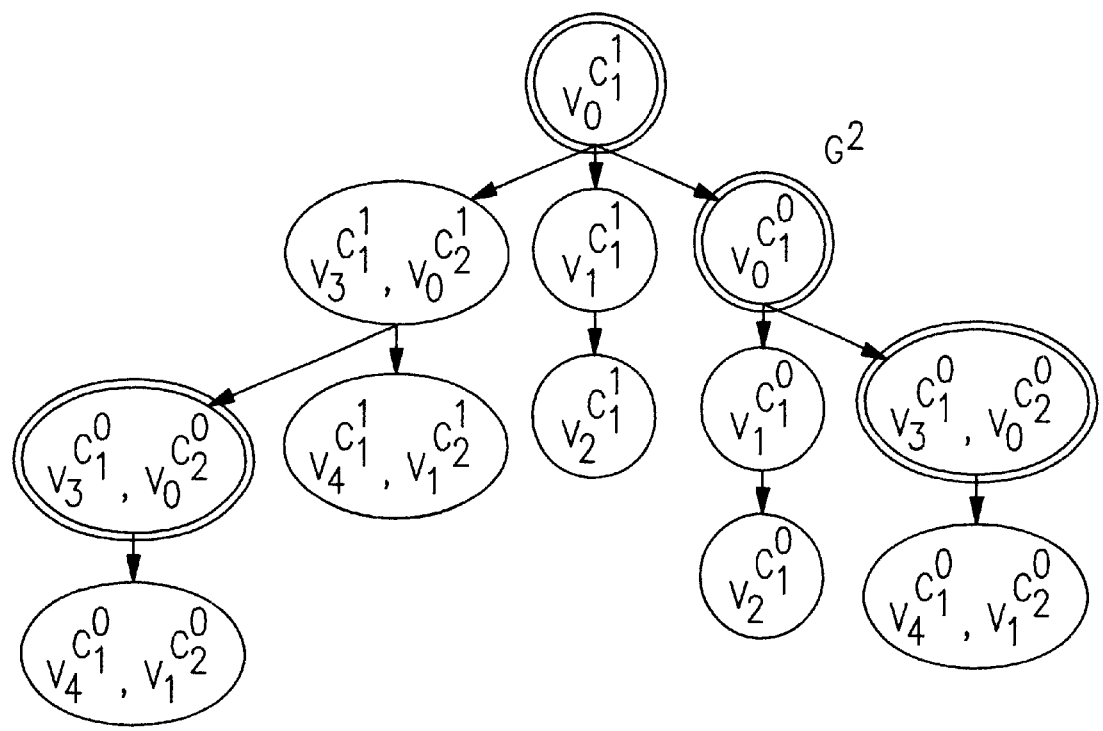
Figure 12A:
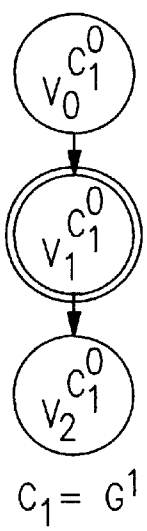
FIGS. 12A–12D is a bounded reciprocal fractal expansion of a graph.
Figure 12B:
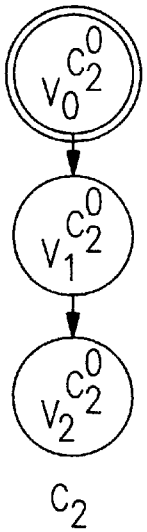
Figure 12C:
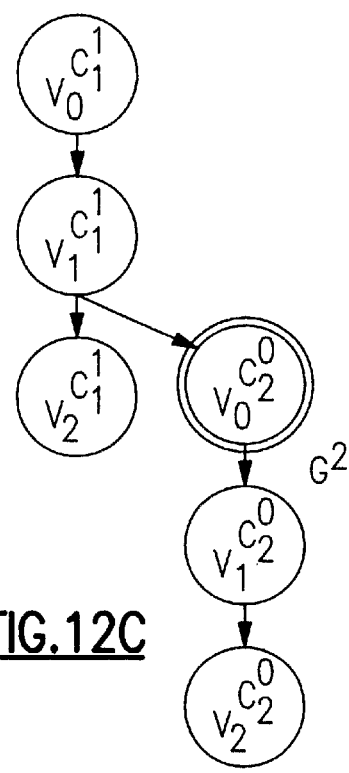
Figure 12D:
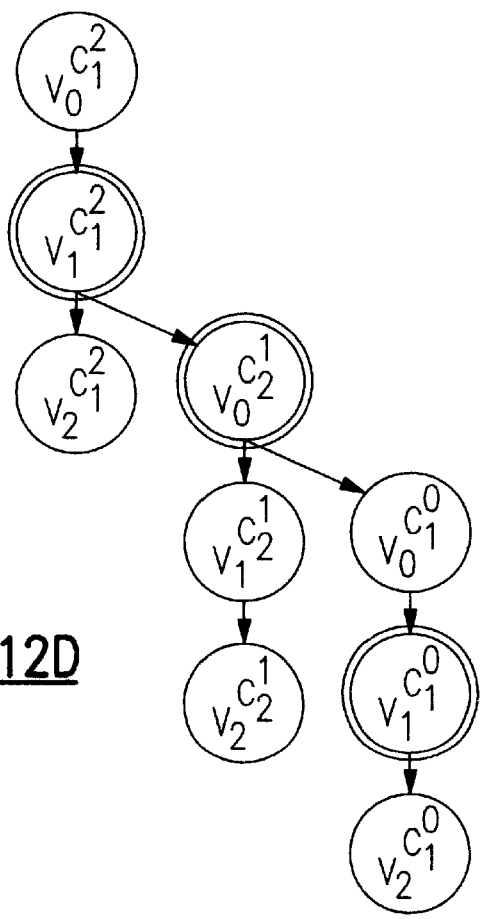
Figure 13A:
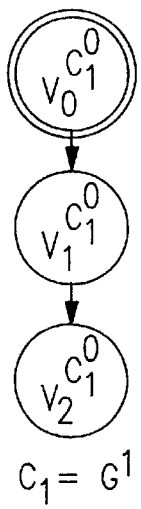
FIGS. 13A–13E is a bounded recurrent fractal expansion of a graph.
Figure 13B:
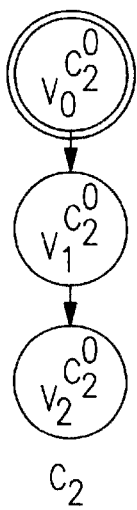
Figure 13C:
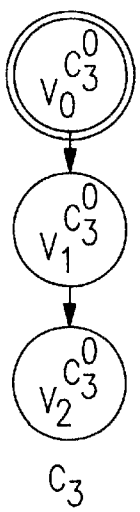
Figure 13D:
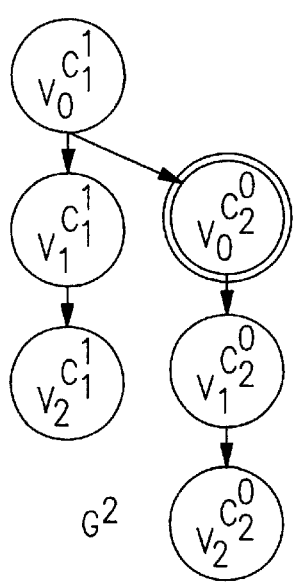
Figure 13E:
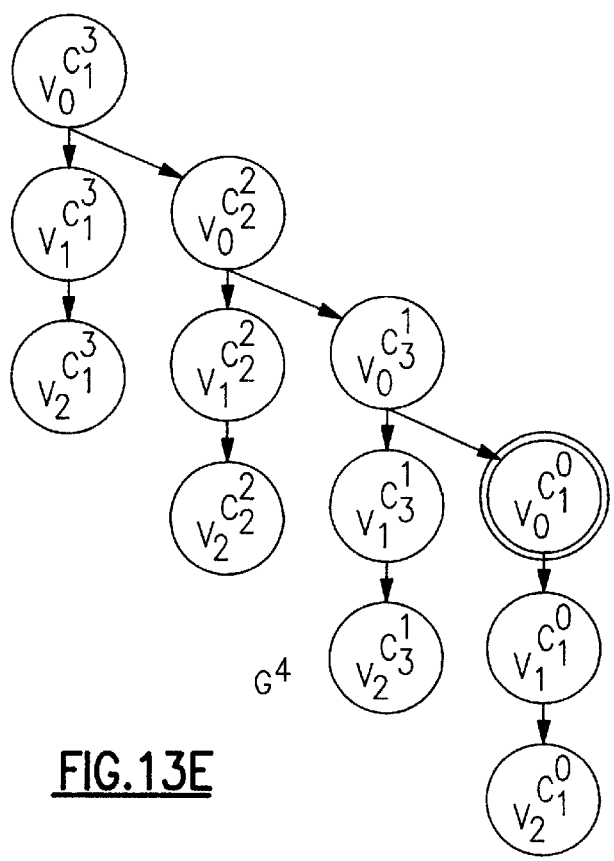

A simple expansion is depicted in FIGS. 10A–10C. A compounded realization is illustrated in FIGS. 11a–11B.

In the case of a reciprocal fractal expansion, we have a "contract" between two trees, $C_1$ and $C_2$ such that at least one vertex in $C_1$ is a generating node for $C_2$, and vice versa. FIGS. 12A–12D is an illustration of the reciprocal fractal expansion.

Finally, there is the recurrent case, in which generating nodes exist in at least three trees such that an infinite recurrent pattern exists which will continuously generate all participating trees. FIGS. 13A–13E illustrate this process.

Implementation

FIGS. 14–18 show various implementations of the fractal process scheduler 10 of the present invention. Each node of the trees in FIGS. 14–18 represents a test case scheduled to a node of the distributed computing system. The bounded realization of fractal expansion which was previously outlined has a double purpose. It limits the fan-out factor of the graph and is also most suitable for implementation. The implementations discussed here rely on recursion calls to generate the self similar expansions. The realizations which follow assume that the fractal cells are represented by flat files, as a sequence of statements. We will name the input files "sequenceN.orig" (see for instance 20 at FIG. 14), where N corresponds to the fractal cell index. The user will mark which statements are to be considered "generating vertices", by following the statement with the "*" symbol and the name of the cell which is generated. The files so marked are named "sequence.input" (see for instance 22 at FIG. 14). The fractal parser will compile these files, produce some intermediate files, "sequenceN.inter" (see for instance 23 at FIG. 15), and a master file which will make the fractal process scheduling, "sequence.master" (see for instance 24 at FIG. 14). The user can then execute sequence.master, and the fractal process scheduling will then happen. The realizations that follow are done in standard "C shell" programming language, which is well understood in the art.

Simple Expansion Realization

Figure 14:
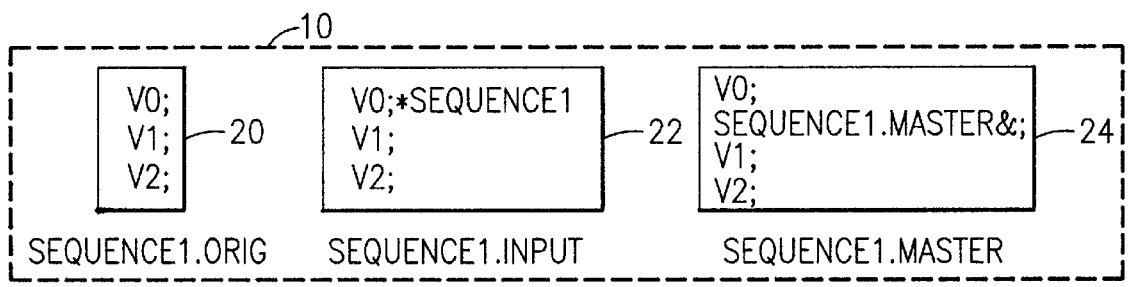
FIG. 14 is a block diagram of a simple expansion embodiment or realization of one expansion of the invention.

The simple expansion realization is rather trivial. Its user interface is illustrated at FIG. 14. The user marks some statements as being "generating vertices" (using the "*" symbol), and the fractal expansion parser will map the input file into another file which will contain "fork" statements for each generating vertex, for instance, to generate the expansion shown in FIGS. 10A–10C. It will be noticed that the simple expansion realization does not include an intermediate file 23.

Compounded Expansion Realization

Figure 15:
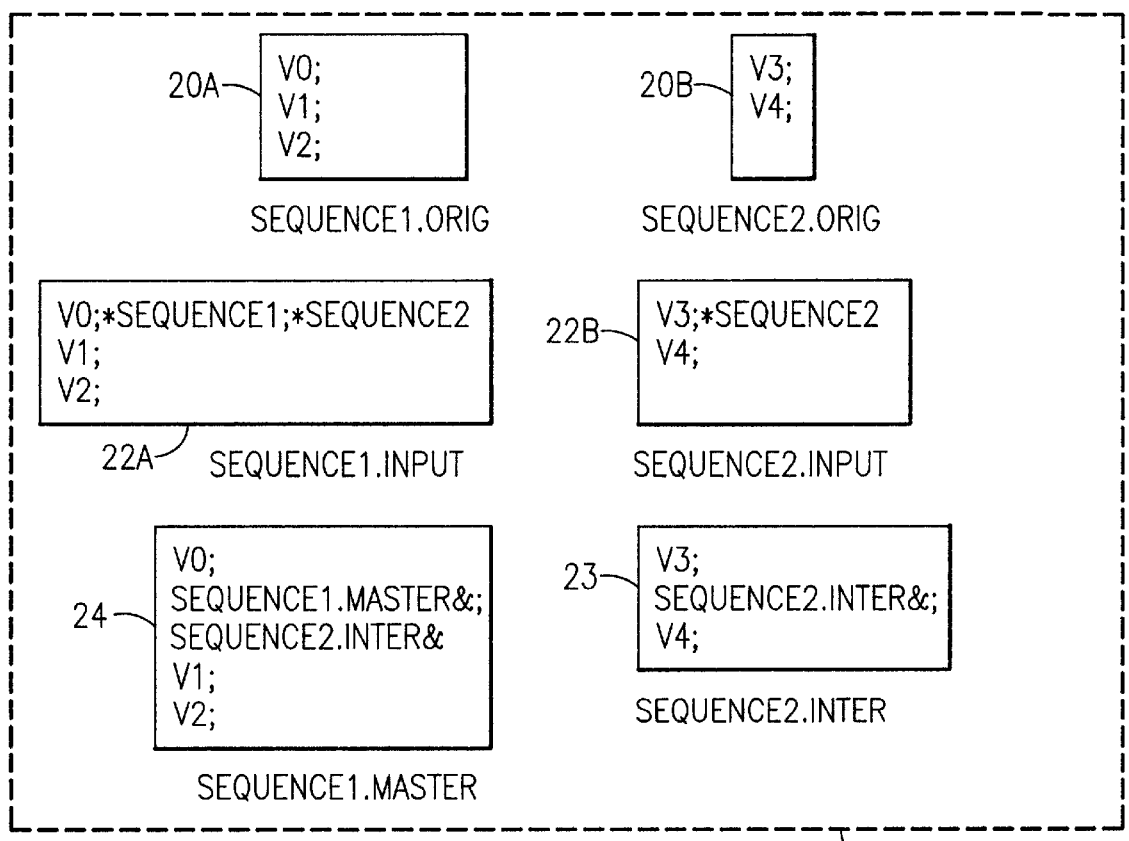
FIG. 15 is a block diagram of a compounded expansion realization of one expansion of the invention.

In the compounded expansion case, each subtree must be represented in a different file. Its user interface is shown at FIG. 15. The user proceeds as in the case above, marking each generating vertex of each subtree at 22A and 22B of FIG. 15, and the fractal expansion parser will produce an intermediate file 23 of FIG. 15 for each subtree, and the master file at 24 of FIG. 15 will be the expansion of the base tree, which contains all the other subtrees. For instance, the realization of the example in FIGS. 11A–11B is shown in FIG. 15.

Reciprocal Expansion Realization

Figure 16:
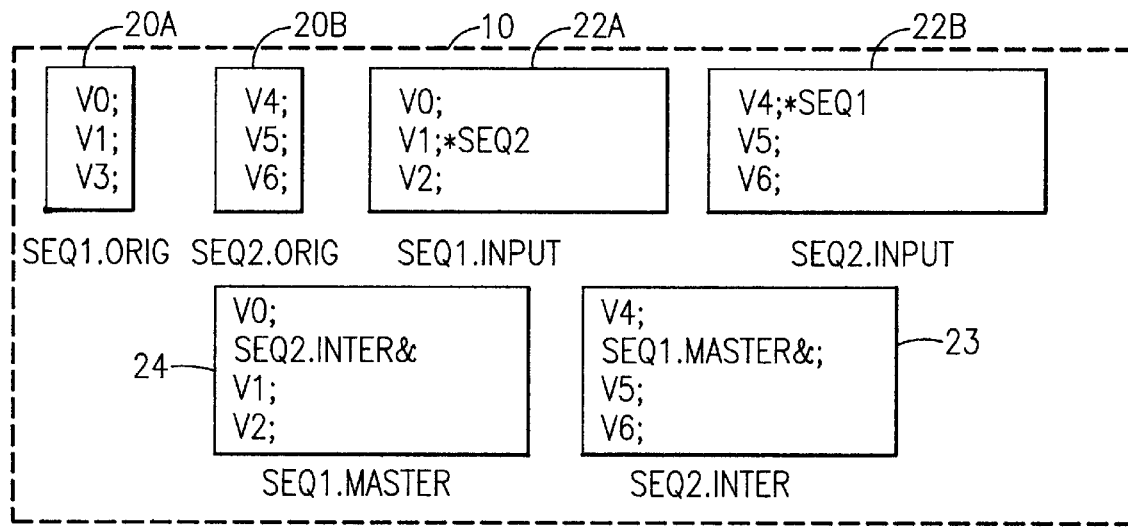
FIG. 16 is a block diagram of a reciprocal expansion realization of one expansion of the invention.

The realization procedure is similar to the cases above, but in this case the input sequences are disjoint. For instance, the expansion for FIGS. 12A–12D is shown in FIG. 16.

Recurrent Expansion Realization

Figure 17:
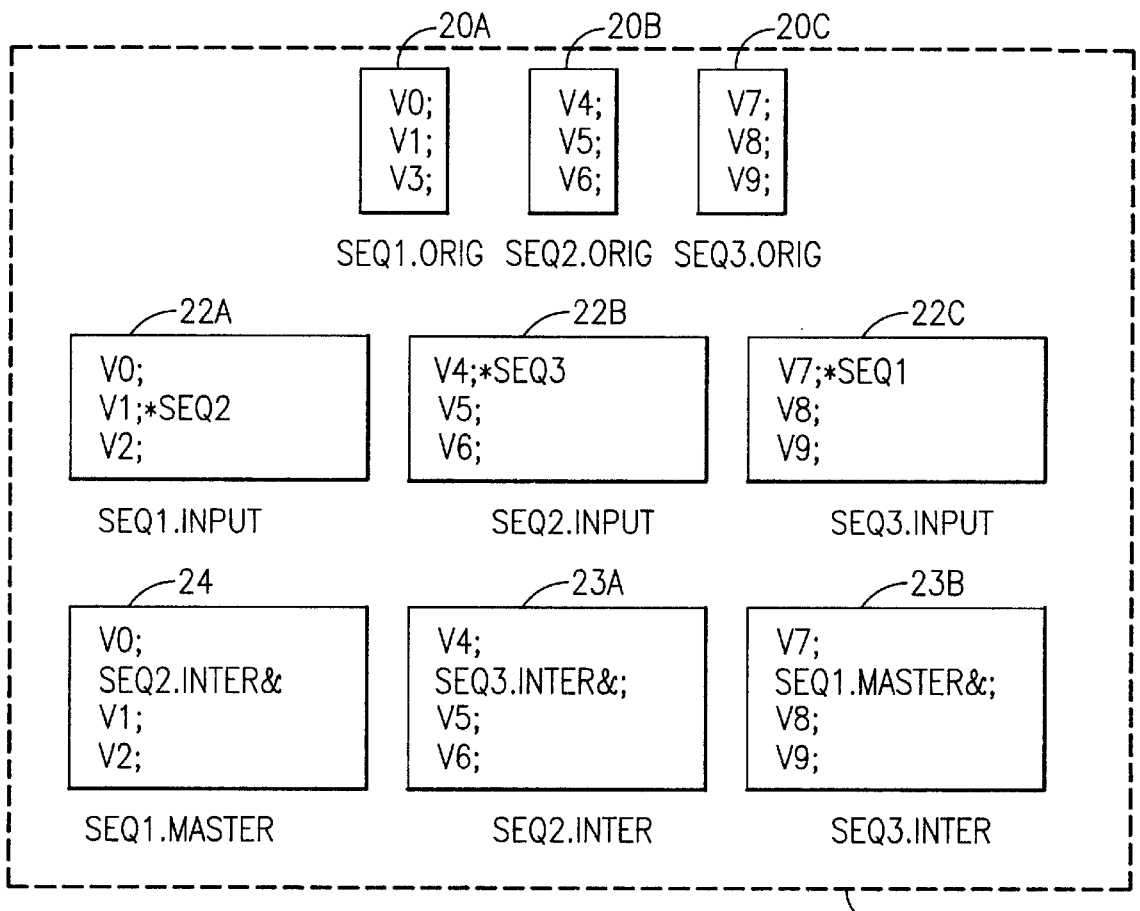
FIG. 17 is a block diagram of a recurrent expansion realization of one expansion of the invention.

This case is analogous to the previous one, but now there are at least three non intersecting sequences involved. FIG. 17 depicts the realization of the expansion shown in FIGS. 13A–13E.

Extensions for Testing Distributed Applications

Figure 18:
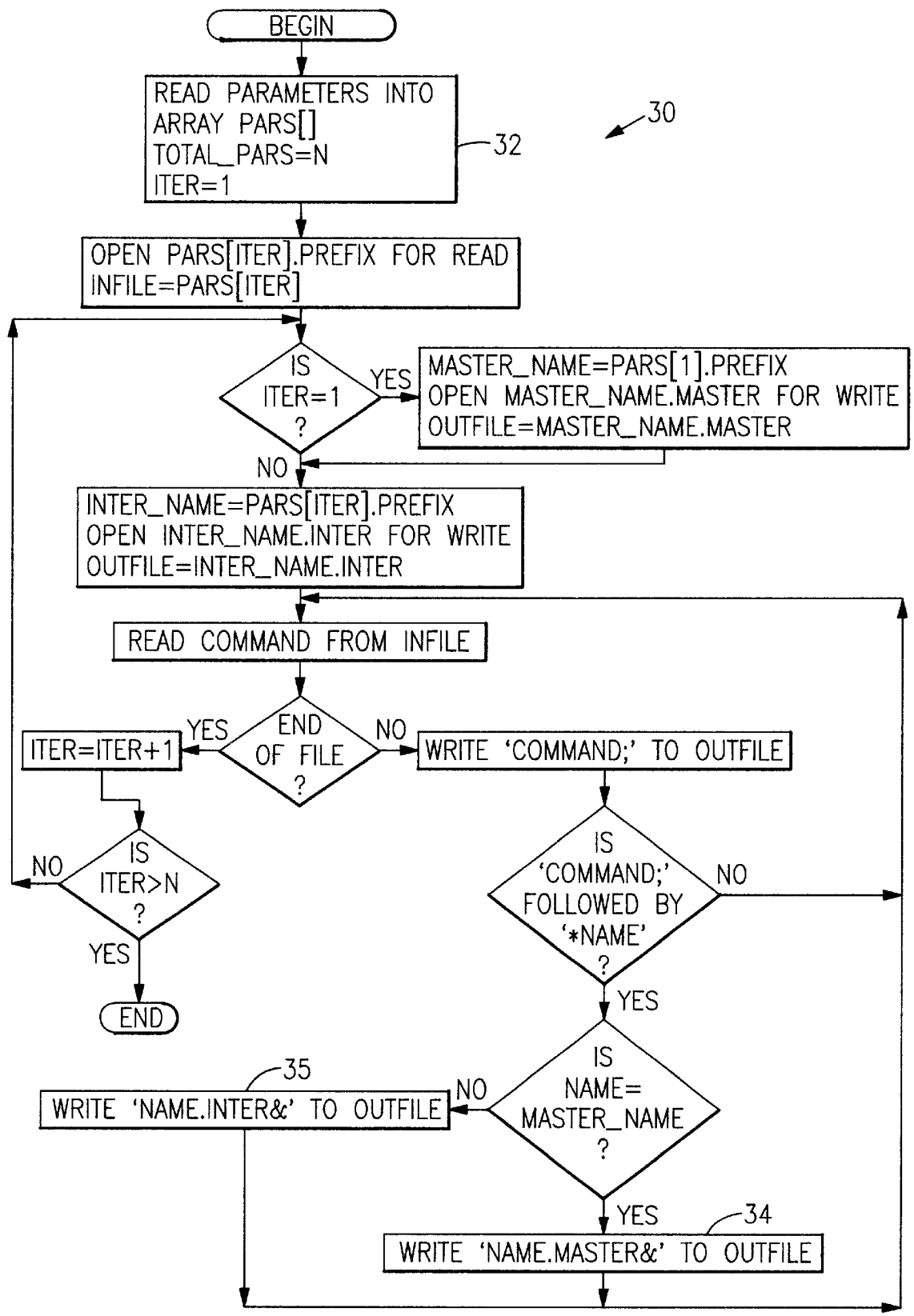
FIG. 18 is a flowchart of a fractal parser of the present invention.

FIG. 18 is block diagram of a fractal parser 30 of the present invention. The input at 32 is a sequence of file-snames {file1.input, file2,input, file3.input . . . , fileN.input}. In the flowchart of FIG. 18, the notation "pars[n].prefix" refers to the prefix name of the nth parameter. For example, it the first parameter is "seq1.input", the notation "pars[1].prefix" denotes the name "seq1". The first file in the list is considered to be the master (root) of the fractal process tree. The files in the k-shell format and have a "*" following a command where the fractal cess is to be inserted, and the "*" is followed by the name of the fractal cell. The output at 34 and 35 is a sequence of files named {file1.master, file2.inter, file3.inter, . . . fileN.inter}. The first file is an executable file in k-shell format which will, when executed, schedule the desired fractal tree. The master format will execute the other executable formats with the postfix ".inter".

In the examples above no mention was made to the scheduling of processes to the different processors (nodes) of a distributed system. Such functionality could be easily obtained by the incorporation of an iteration counter 26 of FIG. 19 on each invocation of the master and intermediate sequences. The scheduling to different processors can be done as a function of that index, according to the number of processors and the range of the counter value. A scheduling scheme which takes into account the fact that the fractal expansion starts with the single execution of the root node and then fans out into a large tree should be utilized. For instance, if we have N processors and the iteration count is i; and we only want to have at most P processes (test cases running on each node), we could use the following scheme:
if $1<i<P$; then schedule the process to all nodes
if $P<i<N$; then schedule the process to node Nmod(i)
if i>Max. Iterations; then exit.

Figure 19:
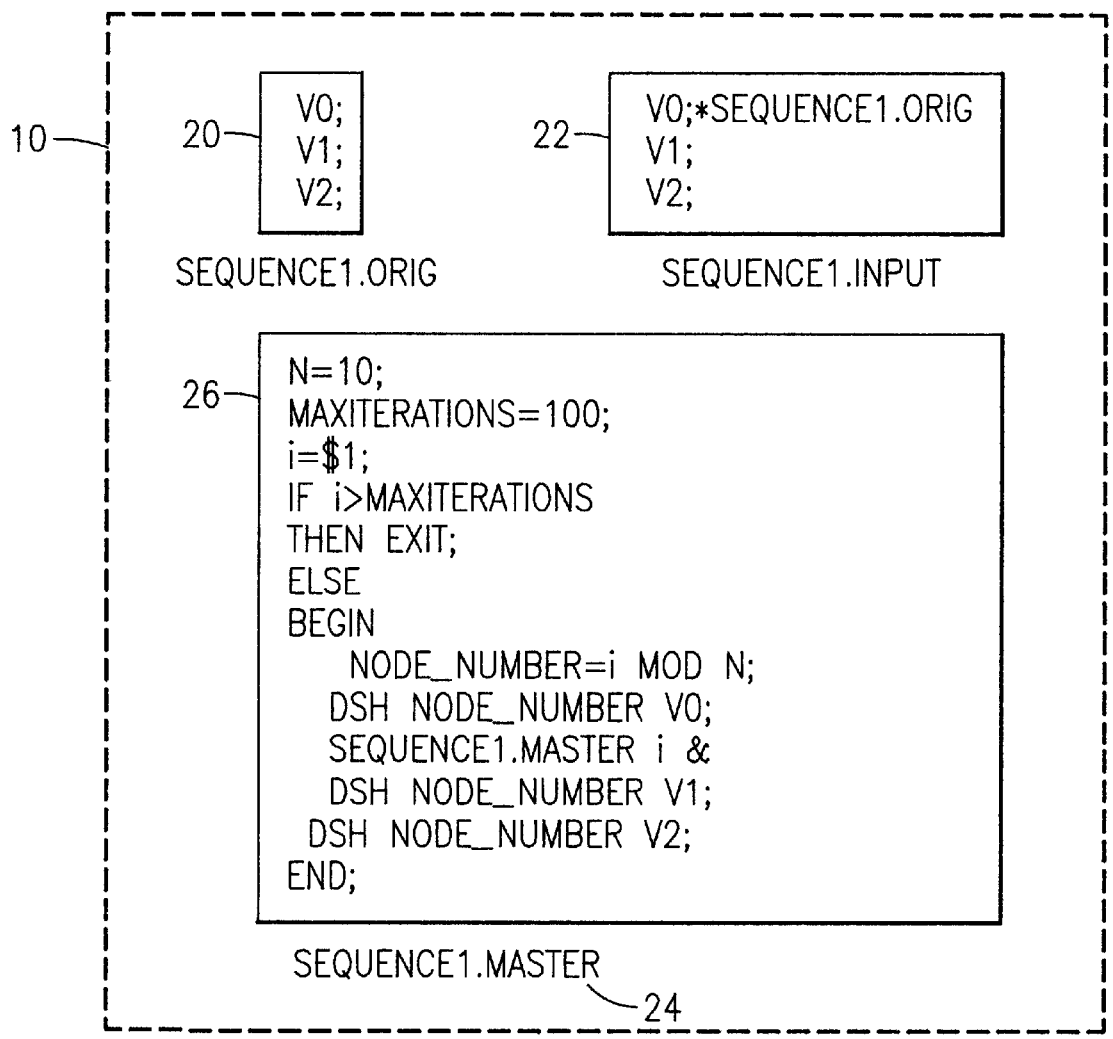
FIG. 19 is a block diagram showing a counter of the invention for scheduling processes of an application of the application to be tested to different nodes of a distributed processing system.

Of course, information is needed on the duration of each given test case in order to be able to ensure that we will actually have at most P processes running on each node. A bound for the maximum number of iterations avoids overloading the system. Such programs could be implemented as part of a graphical interface aid, to be discussed. FIG. 19 illustrates how the fractal parser 30 of FIG. 18 can be augmented to use an iteration counter and a process scheduling program.

Symbolic Notation for a Graphical User Interface

Figure 20:
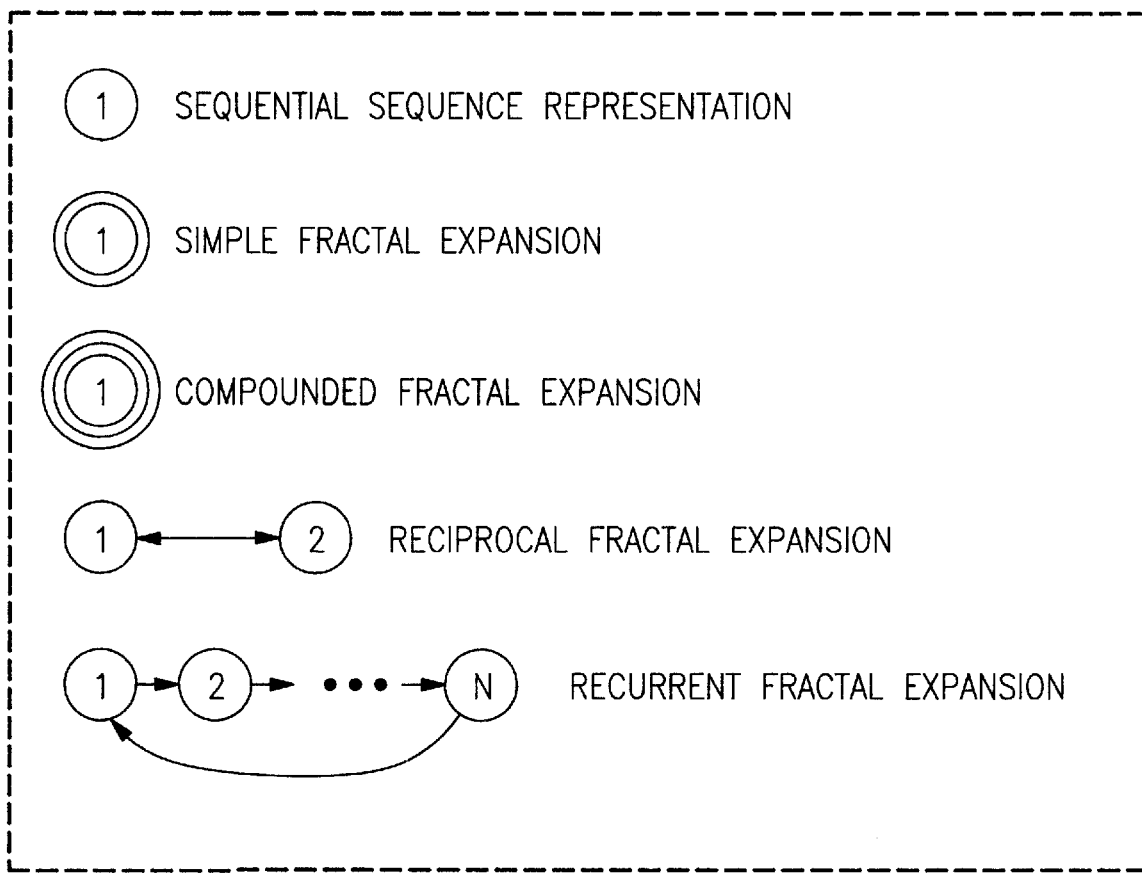
FIG. 20 shows symbolic notation and examples of the utilization of the symbolic notation for use in a graphical user interface usable with the present invention.

As can be seen in the realizations above, the fractal expansion parser is an elementary program which transforms the "*" seq_name" entries in the input file into a fork statement, which call either some parsed intermediate file or the parsed master file. Special care must be taken by the user to ensure that the expansion references of the generating vertices contain a cycle or a self-referral. These constraints could be ensured by the utilization of a graphical user interface which utilizes a symbolic notation. FIG. 20 shows a symbolic notation and a few examples of such utilization.

The notation above is a high level view of the sequence generation dependencies. The high level view does not show any generating vertices. In the graphical user interface implementation, the user would be able to "click" on the icon for a sequence, and that would produce a scroll list with all the statements in the sequence. The user would then be able to select some vertices as generating vertices for the same or different sequences. The sequence Icon would be changed to a simple or compounded expansion if it contains a generating vertex which points to the sequence to which it belongs, and generation edges (recurrent or reciprocal) would be added if the generating vertex points to another sequence. The graphical user interface should enforce the mutual or recurrent dependence of the inter-sequence relationships.

Figure 21:
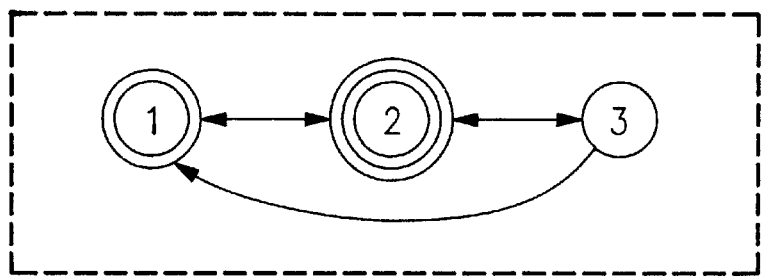
FIG. 21 in one example of the display of the graphical user interface of the present invention.
Figure 22:
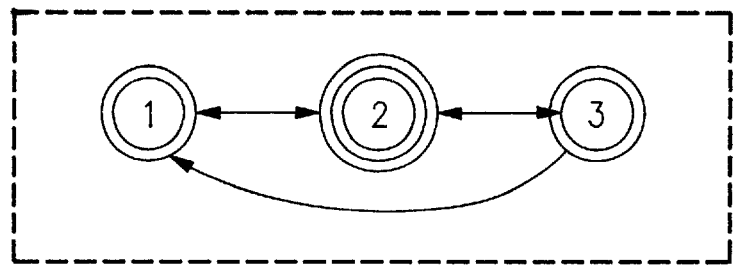
FIG. 22 shows balancing the example of FIG. 21 by adding a simple fractal expansion to a sequence of the example of FIG. 21.

The graphical aid can also serve as a basis for balancing the generation of the sequences. The previous example of FIG. 21 is not strictly balanced, since sequence number 3 is generated only by sequence number 2. The other sequences have a higher "generation factor": sequence 1 is generated twice and sequence 2 is generated three times. Therefore, the statements in sequence 3 would be executed less often. The graphical user interface offers an aid to estimate the number of times each specific sequence is being generated, so that a balanced realization can be achieved. The user then corrects the generation balance by adding or removing some relationships. FIG. 21 is balanced by adding a simple fractal expansion to sequence 3 and a reciprocal relationship with sequence 1, as shown in FIG. 22.

The foundations for the application of fractal geometry to conventional graph theory have been presented, with emphasis in the subject of process scheduling. Computer programs for the realization of the different kinds of fractal expansion are presented, as well as realizations in distributed systems. A symbolic notation has been presented for the hierarchical view of the fractal expansions which facilitate the deployment and balancing of the fractal process scheduling technique. The application of fractal geometry to conventional graph theory, as discussed, is particularly useful when used to test group services of an IBM RS/6000 Scalable POWERparallel SP system, available from International Business Machines Corp. of Armonk N.Y., and as disclosed in U.S. Pat. No. 5,699,501 issued Dec. 16, 1997 and owned by the assignee of the present invention, incorporated herein by reference.

While I have illustrated and described the preferred embodiment of my invention, it is to be understood that I do not limit myself to the precise construction herein disclosed, and the right is reserved to all changes and modifications coming within the scope of the invention as defined in the appended claims.

Having thus described our invention, what I claim as new, and desire to secure by Letters Patent is:

1. A fractal process scheduler for testing applications in a distributed processing system having a plurality of nodes, said scheduler comprising:

an originating file containing a sequence of statements, each statement representing a fractal cell;

an input file comprising statements from said originating file which generate vertices;

a fractal parser for compiling the statements from said input file;

one or more intermediate files produced by said fractal parser comprising intermediate results, said intermediate files being executable for scheduling a process of the application being tested to nodes of said distributed processing system; and a master file produced by said fractal parser, said master file being executable for scheduling a process of the application being tested to nodes of said distributed processing system;

said fractal parser mapping the input file into the intermediate file and the master file in accordance with complex fractal expansions.

2. The fractal process scheduler of claim 1 wherein said intermediate and master files comprise fork statements for each generating vertex, and said fractal parser generates a simple fractal expansion.

3. The fractal process scheduler of claim 1 wherein said originating file comprises a base tree and at least one subtree, said input file comprises each subtree represented in a different file, and said fractal parser generates an intermediate file for each subtree, and said fractal parser further generates a compounded fractal expansion for the base tree.

4. The fractal process scheduler of claim 1 wherein said originating file comprises a base tree and at least one subtree, said input file comprises each subtree represented in a different, disjoint file, and said fractal parser generates an intermediate file for each subtree, and said fractal parser further generates a reciprocal fractal expansion for the base tree.

5. The fractal process scheduler of claim 1 wherein said originating file comprises a base tree and at least two subtrees for at least three non intersecting sequences, said input file comprises each subtree represented in a different file, and said fractal parser generates an intermediate file for each subtree, and said fractal parser further generates a recurrent fractal expansion for the base tree.

6. The fractal process scheduler of claim 1 further comprising a counter for each invocation of each entry in the master file and intermediate file, said counter for scheduling a process of the application being tested to a different one of said nodes.

7. The fractal process scheduler of claim 6 wherein said distributed processing system has N processors, and the application to be tested has P processes, and the count of said counter is i, and wherein said processes are scheduled to said processors as follows:

if 1<i<P, then schedule the process to all nodes;

if P<i<N; then schedule the process to the ith node of the distributed processing system; and if i>than a specified maximum number, then exit.

8. A graphical user interface for a fractal process scheduler for testing applications in a distributed processing system having a plurality of nodes, said graphical user interface comprising:

an originating file representation, said originating file representation having at least one sequence of statements, each statement being labeled by a fractal cell name;

an icon for each sequence, said icon, when selected by a user, displaying a scroll list with all statements in the sequence, said sequence icon changed to a simple or compounded expansion icon form if the sequence contains a generating vertex which points to the sequence to which it belongs, said icon further having recurrent or reciprocal edges added if the generating vertex points to another sequence; and an indication placed on selected statements in said originating file representation by a user, each indication selected by the user to indicate some vertices as generating vertices for the same or different sequences;

said selected statements indicated by said indication being used by the fractal process scheduler to create an input file, and generate therefrom one or more intermediate files and a master file, said intermediate files and said master file being executable for scheduling a process of the application to be tested on a node of the distributed processing system, and said master file mapped in accordance with complex fractal expansions, said complex fractal expansion dependent on the form of the icon selected and the presence of edges on the icon selected.

9. A computer program product usable with a computer usable medium having computer readable program code means therein for implementing a fractal process scheduler for testing applications in a distributed processing system having a plurality of nodes, said computer program product comprising:

a computer readable medium;
computer readable program code on said computer readable medium for providing an originating file containing a sequence of statements, each statement representing a fractal cell;
computer readable program code on said computer readable medium for providing an input file comprising statements from said originating file which generate vertices;
computer readable program code on said computer readable medium for providing a fractal parser for compiling the statements from said input file;
computer readable program code on said computer readable medium for providing one or more intermediate files produced by said fractal parser comprising intermediate results, said intermediate files being executable for scheduling a process of the application being tested to nodes of said distributed processing system; and
computer readable program code on said computer readable medium for providing a master file produced by said fractal parser, said master file being executable for scheduling a process of the application being tested to nodes of said distributed processing system;
computer readable program code on said computer readable medium for mapping the input file by said fractal parser into the intermediate file and the master file in accordance with complex fractal expansions.

10. The computer program product of claim 9 wherein the computer readable program code of said intermediate and master files comprise fork statements for each generating vertex, and said fractal parser generates a simple fractal expansion.

11. The computer program product of claim 9 wherein the computer readable program code of said originating file comprises a base tree and at least one subtree, said input file comprises each subtree represented in a different file, and the computer readable program code of said fractal parser generates an intermediate file for each subtree, and the computer readable program code of said fractal parser further generates a compounded fractal expansion for the base tree.

12. The computer program product of claim 9 wherein the computer readable program code of said originating file comprises a base tree and at least one subtree, the computer readable program code of said input file comprises each subtree represented in a different, disjoint file, and the computer readable program code of said fractal parser generates an intermediate file for each subtree, and the computer readable program code of said fractal parser further generates a reciprocal fractal expansion for the base tree.

13. The computer program product of claim 9 wherein computer readable program code of said originating file comprises a base tree and at least two subtrees for at least three non intersecting sequences, the computer readable program product of said input file comprises each subtree represented in a different file, and the computer readable program code said fractal parser generates an intermediate file for each subtree, and the computer readable program product of said fractal parser further generates a recurrent fractal expansion for the base tree.

14. The computer program product of claim 9 further comprising computer readable program product implementing a counter for each invocation of each entry in the master file and intermediate file, said counter for scheduling a process of the application being tested to a different one of said nodes.

15. The computer program product of claim 14 wherein said distributed processing system has N processors, and the application to be tested has P processes, and the count of said counter is i, and wherein the computer readable program product of said counter schedules said processes to said processors as follows:
  if $1<i<P$, then schedule the process to all nodes;
  if $P<i<N$; then schedule the process to the ith node of the distributed processing system; and
  if i>than a specified maximum number, then exit.

16. A method for testing applications in a distributed processing system having a plurality of nodes, said method comprising:
  providing an originating file containing a sequence of statements, each statement representing a fractal cell;
  providing an input file comprising statements from said originating file which generate vertices;
  compiling the statements from said input file;
  providing one or more intermediate files produced by said fractal parser comprising intermediate results, said intermediate files being executable for scheduling a process of the application being tested to nodes of said distributed processing system; and
  producing a master file by said fractal parser, said master file being executable for scheduling a process of the application being tested to nodes of said distributed processing system;
  mapping by said fractal parser, the input file into the intermediate file and the master file in accordance with complex fractal expansions.

17. The method of claim 16 wherein said intermediate and master files comprise fork statements for each generating vertex, and generating by said fractal parser, a simple fractal expansion.

18. The method of claim 16 wherein said originating file comprises a base tree and at least one subtree, said input file comprises each subtree represented in a different file, and generating by said fractal parser, an intermediate file for each subtree, and further generating by said fractal parser, a compounded fractal expansion for the base tree.

19. The method of claim 16 wherein said originating file comprises a base tree and at least one subtree, said input file comprises each subtree represented in a different, disjoint file, and generating by said fractal parser, an intermediate file for each subtree, and further generating by said fractal parser, a reciprocal fractal expansion for the base tree.

20. The method of claim 16 wherein said originating file comprises a base tree and at least two subtrees for at least three non intersecting sequences, said input file comprises each subtree represented in a different file, and generating by said fractal parser, an intermediate file for each subtree, and further generating by said fractal parser, a recurrent fractal expansion for the base tree.

21. The method of claim 16 further comprising scheduling for each invocation of an entry in said master file and said intermediate file, a process of the application being tested to a different one of said nodes.

22. The method of claim 21 wherein said distributed processing system has N processors, and the application to be tested has P processes, and the count of said invocations is i, and comprises scheduling said processes to said processors as follows:
  if $1<i<P$, then schedule the process to all nodes;
  if $P<i<N$; then schedule the process to the ith node of the distributed processing system; and
  if i>than a specified maximum number, then exit.

* * * * *